May 18, 1937.    F. M. HIGGINS ET AL    2,080,477
COMPENSATING DIFFERENTIAL
Filed Aug. 23, 1935    2 Sheets-Sheet 1
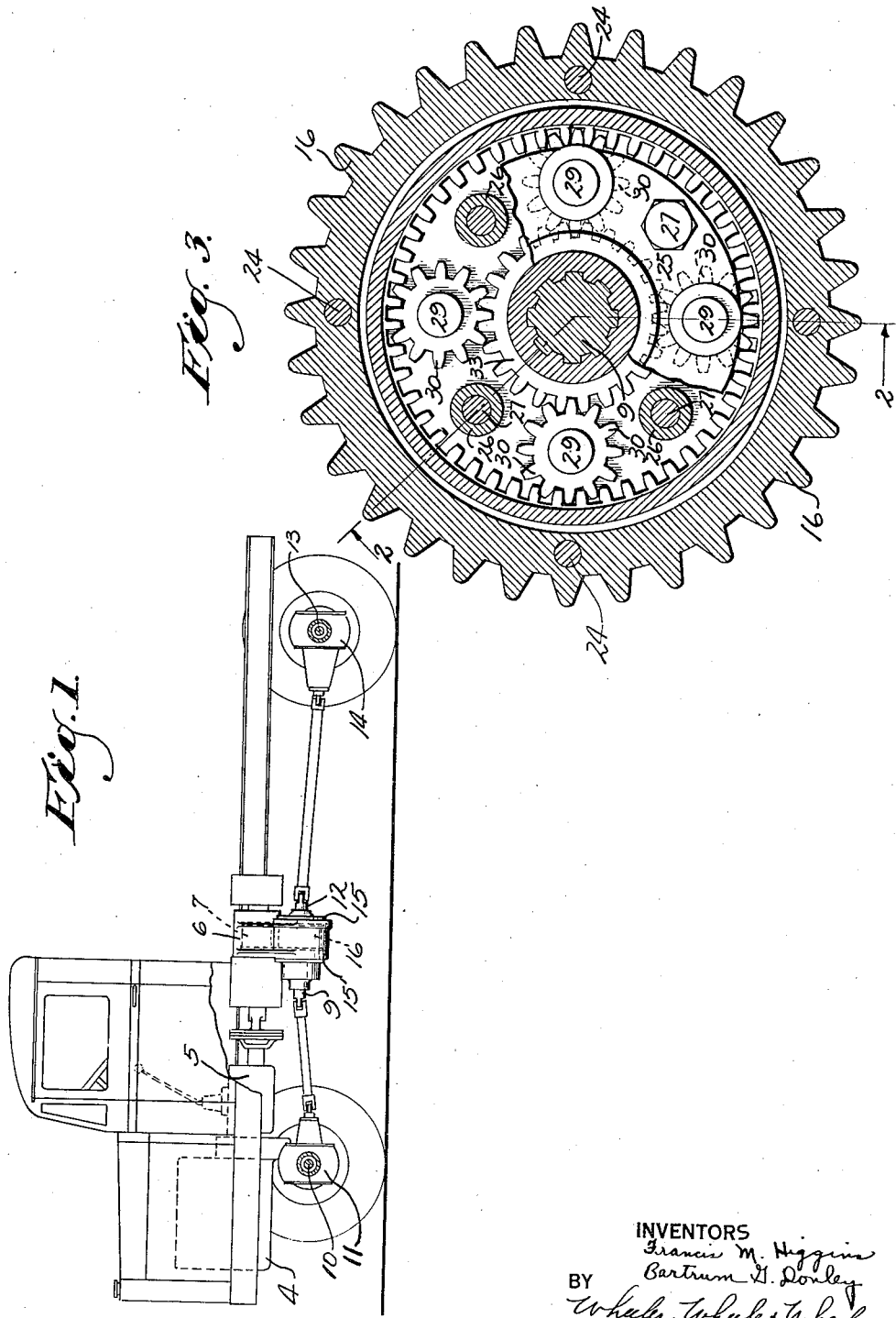
INVENTORS
Francis M. Higgins
Bartrum J. Donley
BY
Wheeler Wheeler & Wheeler
ATTORNEYS

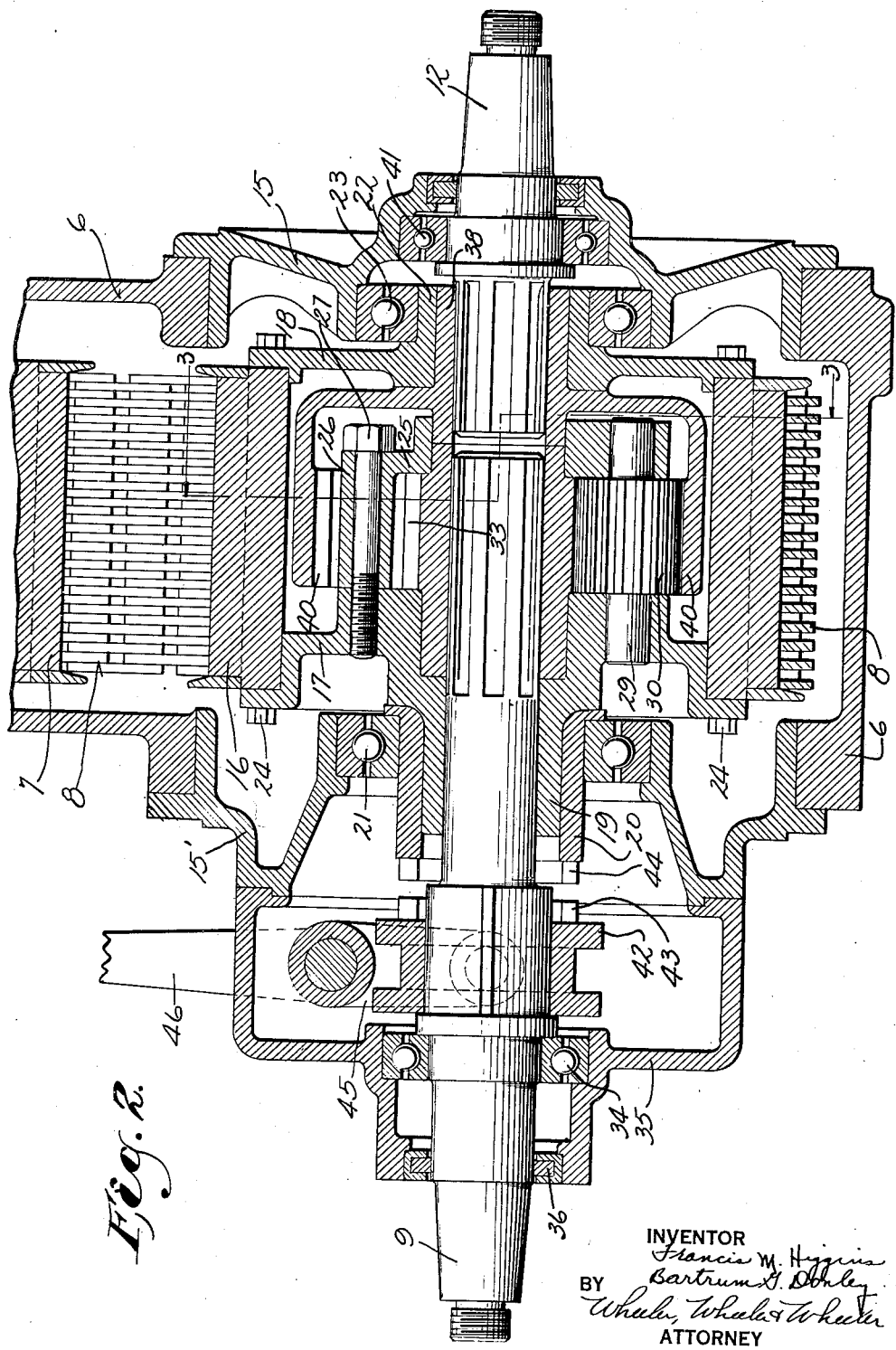

Patented May 18, 1937

2,080,477

UNITED STATES PATENT OFFICE 2,080,477

COMPENSATING DIFFERENTIAL

Francis M. Higgins and Bartrum G. Donley, Clintonville, Wis., assignors to The Four Wheel Drive Auto Company, Clintonville, Wis., a corporation of Wisconsin Application August 23, 1935, Serial No. 37,414

2 Claims. (Cl. 74—310)

This invention relates to improvements in compensating differentials.

The invention has particular utility in four wheel drive automobiles as a means of compensating the torque transmitted to the front and rear axles of the vehicle. In trucks, for example, the rear axle may be much more heavily loaded than the front, and accordingly the wheels are less likely to slip. Therefore, the planetary gearing in the differential of this invention is so devised that in the event of relative movement between the front and rear axles the ratio of mechanical advantage of the source of power with respect to the front axle will be lower than the ratio of mechanical advantage of the source with respect to the rear axle, so that the rear axle, in any such case, will receive a major portion of the available torque.

It is the object of the invention to provide a novel and improved mechanical construction for the purposes aforesaid, to provide great strength and durability in a very compact and simple differential unit.

In the drawings:

Figure 1 is a diagrammatic view partially in side elevation and partially in longitudinal section, showing a four wheel drive truck to which this invention is applied.

Figure 2 is an enlarged detail view showing a section taken axially through the improved differential of this invention on the line 2—2 of Figure 3.

Figure 3 is a sectional view transversely through the differential in two different planes, exposing the interior mechanism thereof.

Like parts are identified by the same reference characters throughout the several views.

The power developed by the truck engine 4 is delivered rearwardly through the conventional rate changer 5 to the transmission casing 6 within which the driving sprocket 7 operates a silent chain 8 to drive the center differential, to which this invention pertains.

From the central differential the power is transmitted through front drive shaft 9 to the front axle 10 through a conventional differential housed in the casing 11, and through rear drive shaft 12 to the rear axle 13 through a conventional differential housed in the rear axle differential casing 14.

The center differential and compensating gear will now be described.

Between the closure heads 15 and 15' of casing 6 is a large sprocket 16 mounted on the shouldered peripheries of the annuli 17 and 18 which comprise parts of the differential cage or spider.

Annulus 17 has a hub portion 19 to which the clutch sleeve 20 is fastened. The clutch sleeve is supported in the inner race of a ball bearing unit 21 mounted in the casing member 15'.

Annulus 18 likewise has a hub portion shown at 22 which is supported within the inner race of a ball bearing unit 23 mounted in the member 15. The bolts 24 hold the annuli 17 and 18 together and maintain the sprocket 16 in rigid and unitary connection therewith so that the whole cage turns as one element upon the bearings 21 and 23.

Likewise, comprising a part of the cage or spider driven by chain 8, is a third annulus 25 having legs 26 through which the cap screws 27 extend into threaded engagement with annulus 17 to hold annulus 25 in unitary connection therewith. The annuli 17 and 25 provide bearings for the trunnions 29 of the planetary pinions 30 which are arranged in annular series about the axes of the several elements comprising the cage or spider. These several pinions mesh with a central or sun gear 33 in splined connection with the forward drive shaft 9, said shaft having a bearing within the hub 19 of annulus 17, and being further provided with an anti-friction bearing support at 34 from the casing closure 35, the latter being applied at one end of member 15' as clearly shown in Figure 2. An oil seal at 36 comprising a channeled ring holding packing against shaft 9 closes the casing about this shaft to prevent the loss of oil.

Splined upon the rear driving shaft 12 is the hub 38 of a cup gear 40 meshing with the several planetary pinions 30. The rear driving shaft 12 is provided with a ball bearing 41 supporting it from the casing head 15, and it is also provided with support by the bearing upon the hub portion 38 of the cup gear and the hub portion 22 of the cage.

For use on those occasions when no amount of compensation would prevent slippage of one axle or the other, we prefer to provide a differential locking device for clutching one of the two driven shafts 9 or 12 positively to the cage, thus preventing any differential action whatever. This may conveniently be done by splining a spool-shaped clutch collar 42 to the driven shaft 9 and providing clutch teeth 43 upon the collar, and corresponding clutch teeth 44 upon the clutch sleeve 20 of the cage. An ordinary shipping fork 45 is operated by lever 46 to move the collar to and from positions of engagement of clutch teeth 43 with clutch teeth 44.

It is particularly to be noted how the several component parts of the cage or spider co-act with each other to mount and confine the several gears of the planetary differential system. The length of the legs 26 of annulus 25 determines the spacing between annulus 25 and annulus 17 accurately to confine and position the shouldered sun gear 33 which is held therebetween, as clearly shown in Figure 2. Similarly, the positioning of these two annuli fixes the location of the planetary pinions 30 which are held therebetween, as likewise shown in Figure 2.

The connection between the parts 17 and 18 of the spider or cage not only holds the driven sprocket 16 but also engages the outer face of the cup gear 40 to confine said cup gear against the end of the sun gear 33. The result is a very compact, durable, and sturdy organization, capable of transmitting great torque and yet housed within a very limited space.

We claim:

1. A compensating differential comprising the combination with aligned driven shafts, of a sun gear on one of said shafts and a concentric ring gear upon the other, said gears having hubs in substantial abutment, first and second cage elements in radial and thrust bearing relation to the respective hubs and peripherally shouldered, a driving annulus engaged with the shoulder portions of the first and second cage elements and comprising spacing means therefor, means clamping said elements together upon the intervening driving annulus, a third cage element in radial bearing relation to both of the aforesaid hubs and in thrust bearing relation to the hub portion of the sun gear, means rigidly connecting said third cage element with one of said first mentioned cage elements, and driving pinions carried by said third cage element and the element with which said third cage element is connected, said pinions meshing with said ring gear and sun gear.

2. A compensating differential comprising the combination with a pair of aligned driven shafts, of a casing provided with bearings for the respective shafts, a pair of axially spaced cage elements separately provided with bearings in said casing, concentric sun and ring gears having hub portions connected with the ends of the respective shafts, each of said hub portions having a radial and thrust bearing relation to one of said cage elements, a driving annulus positioned between said cage elements as a spacer therefor, means securing said cage elements to said annulus, a third cage element bearing upon a hub portion of at least one of said gears and disposed within said ring gear and in rigid connection with one of said first mentioned cage elements and a set of planetary pinions meshing between said ring gear and sun gear and provided with mountings on said third cage element and the cage element with which said third cage element is connected.

FRANCIS M. HIGGINS.
BARTRUM G. DONLEY.